United States Patent Office.

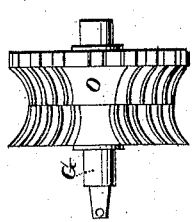
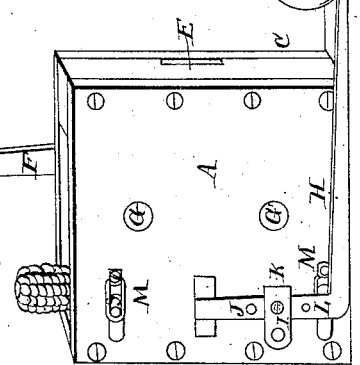
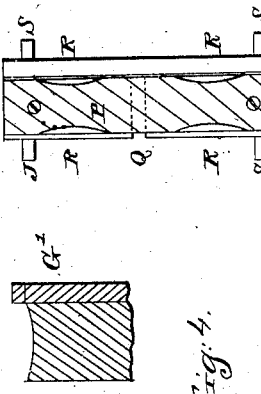
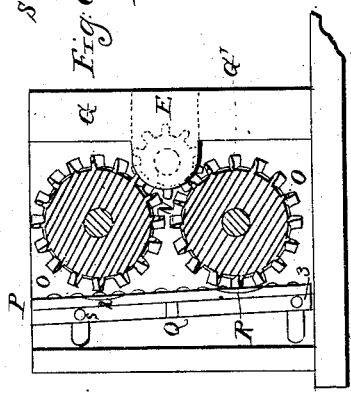
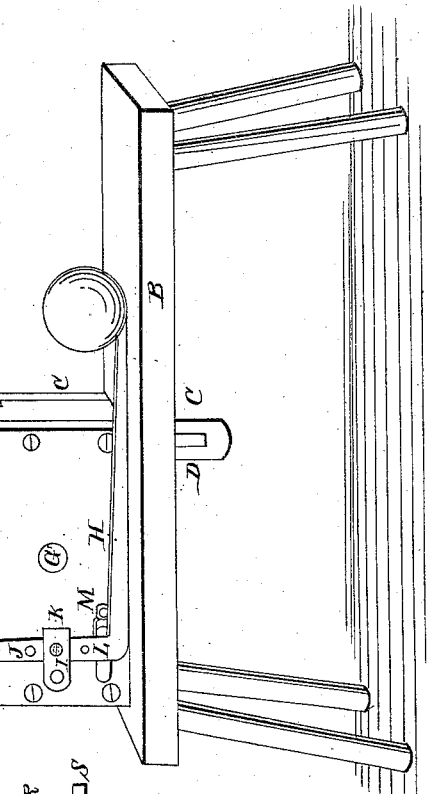

LEWIS T. NEWELL, OF SPRINGVILLE, NEW YORK.

Letters Patent No. 62,671, dated March 5, 1867.

IMPROVEMENT IN CORN SHELLERS.

*The Schedule referred to in these Letters Patent and making part of the same.*

TO ALL WHOM IT MAY CONCERN:

Be it known that I, LEWIS T. NEWELL, of Springville, in the county of Erie, and in the State of New York, have invented certain new and useful improvements in Corn Shellers, and do hereby declare that the following is a full, clear, and exact description thereof, reference being had to the accompanying drawings, and to the letters of reference marked thereon.

The nature of my invention consists in the combination and arrangement of two or more grooved or toothed concave wheels, one or more of said wheels being less concave than the others; and a grooved concave spring board, in which the depth of the concavity gradually decreases from the top to the bottom; and in leaving openings in the shelling-wheels, which are made by leaving out one or more of the shelling teeth, for the purpose of allowing the corn to be more readily drawn into the machine, said openings being so arranged on the several wheels that when the first opening is placed in the proper position to receive the corn when introduced, which position is obtained by raising the handle up to its highest point, the openings in the succeeding wheels will be in the proper position to catch the end of the ear as it comes down; also, in so forming or shaping the shelling teeth that, in the operation of shelling, they will strike between the grains and force them off without scraping or rubbing. It further consists in a weighted bar or lever, when so arranged that the fulcrum may be changed, so that by the same weight different degrees of pressure may be given to the spring board.

In the several figures, like letters represent similar parts in each.

Figure 1 represents a section through a fragment of the lower wheel.

Figure 2, a perspective view of the machine complete.

Figure 3, a side elevation of one of the upper shelling-wheels, showing the arrangment of the shelling teeth and teeth for gearing.

Figure 4 is an inside view of the working parts of the machine, and a vertical section through the shelling-wheels, showing the shape of the shelling teeth and gearing.

Figure 5 represents a front view of the spring board; and

Figure 6, a perspective view.

A is the box for holding the shelling-wheels and spring board. B, the bench to which it is fastened. C, a post, forming part of the box; it is fastened to the bench by the wedge or pin D. H is the weighted lever; its fulcrum is changed by changing the position of the piece I, and placing the pin K in either of the apertures J L, or the one between them, by which means the pressure of the spring board against the corn may be either increased or diminished without changing the weight on the end of the lever. G represents the upper shelling and spur-wheel, and G′ the lower one: they receive their motion by the handle F, which is attached to one of the shelling-wheels. The pinion-wheel N, gearing into each of the shelling-wheels, causes the lower one to revolve in the same direction as the upper one. The shelling-wheels have a double set of wedge-shaped teeth, for shelling, the position and shape of which, and arrangement, are clearly shown in figs. 3 and 4. The upper wheel is made more concave than the lower one, as will be readily seen by reference to figs. 1 and 3. P represents the spring board; it is held up against the corn by the upper end of the lever H, which is made so as to fit into the opening Q, made to receive it. R R and R R represent parts of the spring board which are cut away to allow the wheels G and G′ to be brought nearer to it. M M, in fig. 4, represent rubber springs, which can be used to increase the pressure of the spring board if necessary. E is an opening in the post C, into which the pinion N is fitted. The concave surface of the spring board is made deeper at the top than at the bottom, the depth of which gradually diminishes from the top to the bottom, and which is clearly shown in fig. 6.

What I claim as my invention, and desire to secure by Letters Patent, is—

1. The combination of two or more concave wheels, similar to G and G′, when one or more of said wheels are made with the toothed concave surfaces deeper than the others, substantially as described.

2. The weighted lever H, provided with the movable piece I, pin K, and apertures J and L, or the equivalent thereof, substantially as and for the purposes described; and in combination therewith I claim the spring board P, when constructed as described.

3. I also claim the shape and general arrangement of the wheels G and G′, by which I combine in one the shelling and gearing teeth.

LEWIS T. NEWELL.

Witnesses:
JAMES SANGSTER,
URIAL TORREY.